United States Patent [19]

Smilanich

[11] 4,404,266
[45] Sep. 13, 1983

[54] MINIATURE AIR CELLS WITH SEAL

[75] Inventor: Nicholas J. Smilanich, Rocky River, Ohio

[73] Assignee: Union Carbide Corporation, Danbury, Conn.

[21] Appl. No.: 358,279

[22] Filed: Mar. 15, 1982

[51] Int. Cl.³ ............................................. H01M 4/00
[52] U.S. Cl. .................................. 429/27; 429/36; 429/174; 429/185
[58] Field of Search .................. 429/27-29, 429/174, 171, 34-39, 185

[56] References Cited

U.S. PATENT DOCUMENTS

| | | | |
|---|---|---|---|
| 3,746,580 | 7/1973 | Aker et al. | 136/86 A |
| 3,837,921 | 9/1974 | Henssen | 429/27 |
| 3,855,000 | 12/1974 | Jammet | 136/86 A |
| 3,897,265 | 7/1975 | Jaggard | 136/86 A |
| 4,011,365 | 3/1977 | Lindstrom | 429/60 |
| 4,041,211 | 8/1977 | Wiacek | 429/36 |
| 4,066,822 | 1/1978 | Przybyla et al. | 429/27 |
| 4,105,830 | 8/1978 | Kordesch | 429/27 |
| 4,112,198 | 9/1978 | Przybyla | 429/27 |
| 4,118,544 | 10/1978 | Przybyla et al. | 429/27 |
| 4,189,526 | 2/1980 | Cretzmeyer et al. | 429/13 |
| 4,282,293 | 8/1981 | van Lier | 429/174 X |
| 4,343,869 | 8/1982 | Oltman et al. | 429/27 |

FOREIGN PATENT DOCUMENTS 5550579 4/1980 Japan .
55105961 8/1980 Japan .

Primary Examiner—Charles F. Lefevour
Attorney, Agent, or Firm—William E. Dickheiser

[57] ABSTRACT

A sealed miniature air cell having an adhesively coated, resiliently deformable member disposed between the base of the cell container which has at least one air opening therein and the air electrode, said member having an aperture defined therein which encompasses the at least one air opening in the container base and whereby said member provides support for said air electrode, provides an air diffusion chamber defined by said aperture, said air electrode and said cell container base, and effectively prevents electrolyte creepage into said air diffusion chamber.

8 Claims, 2 Drawing Figures

FIG. 1
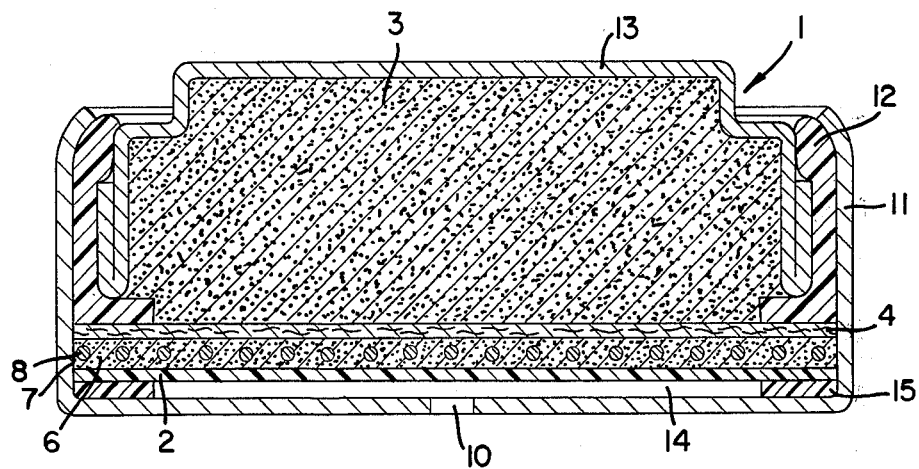
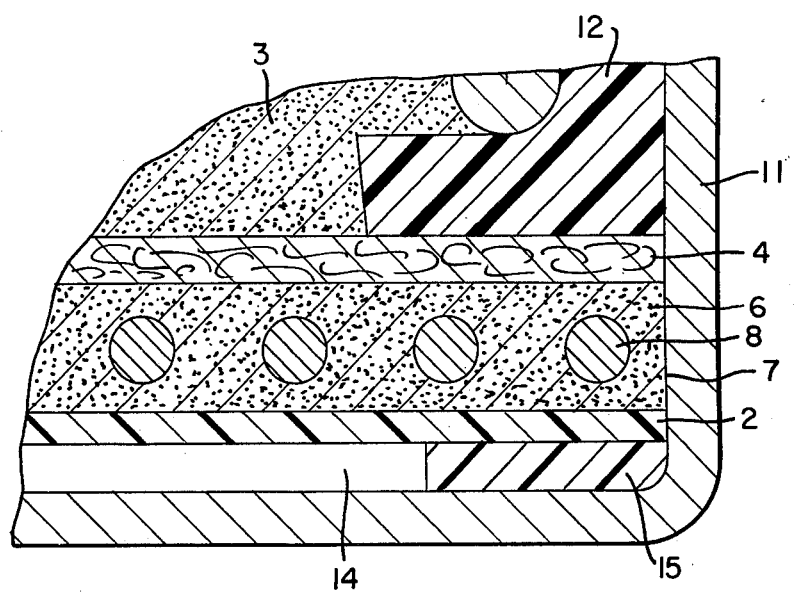
FIG. 2

MINIATURE AIR CELLS WITH SEAL

DESCRIPTION

Technical Field

This invention relates to a seal for miniature air cells comprising a resiliently deformable member coated with a sealing agent and disposed between the air electrode and the base of the cell container which has at least one air opening therein, said member having an aperture defined therein which encompasses the at least one air opening in the container base, and wherein said member supports said air electrode, provides space within its aperture for a thin air diffusion chamber defined between said air electrode and the base of said cell container and provides a seal to effectively prevent electrolyte creepage into said air diffusion chamber.

Background Art

Miniature air cells, such as miniature alkaline air cells, are stable high energy sources for electrical devices such as hearing aids. As the electronic circuitry for such devices becomes smaller, designers have sought to impose dimensional limitations on the cells which power such devices, so as to reduce the overall size of said electrical devices. There is now an increased demand for electrochemical cells wherein at least one dimension is extremely small. Within the confines of an electrochemical cell, which cell is a miniature alkaline air cell, the alkaline electrolyte must be sealed therein to prevent corrosive damage to the exterior of the cell and possibly to the electrical device in which it is housed, while a continuous supply of air must be provided to the surface of the air electrode. Further, the amount of anodic material, which is determinative of the life of the cell, requires a cell design whereby a maximum volume is provided for said anodic material so as to insure a long-life cell.

Generally, a miniature alkaline air cell comprises an outer metal container having at least one air opening in its base to provide air to the active air electrode, a hydrophobic film layer, an air electrode, a separator layer, an anode mass and an electrolyte. The cell assembly is capped with a gasket and metal cell cover which seals the open end of the cell container thereby sealing in the alkaline electrolyte.

It is well known that alkaline electrolytes such as aqueous potassium hydroxide and sodium hydroxide solutions have a propensity to wet along metal surfaces such as the metal surfaces of the cell container and cover and to escape from the cell. Such leakage depletes the electrolyte solution, which may shorten cell life and cause the deposition of corrosive salts on the outer surface of the cell. In air cells, electrolyte creepage may occur at the interfaces between the sealing gasket and the metal container, between the sealing gasket and the metal cover, and between the air electrode and the container sidewalls such that corrosive salts may accumulate on the exterior of the container around the air openings. While elaborate precautions are known to prevent electrolyte creepage at the interfaces between the container and sealing gasket and between the cover and sealing gasket, a simple reliable seal is needed to prevent electrolyte creepage past the interface between the air electrode and container sidewall and out through the air openings.

When the air electrode is in intimate contact with the base of the cell container, the air openings in the container base generally do not provide air uniformly across the electrode surface. By providing a space between the air electrode and the base of the cell container, commonly known as an air diffusion chamber, air can be supplied uniformly across the entire surface of the air electrode. The air diffusion chamber is often filled with a porous material which maintains the structural integrity of the air diffusion chamber.

The amount of air which reaches the air electrode can be partially controlled by the number and size of the air openings in the container base. Unlimited air access to the air electrode may result in shortened cell life, especially in cells designed for low current demands. Therefore, U.S. Pat. Nos. 4,118,544 and 4,189,526 disclose the inclusion of a gas diffusion limiting material in the air diffusion chamber to provide controlled air access to the air electrode, thereby controlling the active life characteristics of the cell.

When incorporated into a cell that has a limited height design, the height allocated to the air diffusion chamber must be minimized so as to maximize the cell volume available for active anode material. However, air diffusion chambers are often provided at the expense of cell height by incorporating a step in the periphery of the cell container base as disclosed in U.S. Pat. No. 3,897,265 to Jaggard, wherein said step also provides sealing means whereby the outer edge of the air electrode, its hydrophobic film layer and the cell separator layer are compressed between the stepped portion of the cell container and the horizontally disposed extension of the seal gasket. The container must comprise metal of sufficient thickness to withstand, without cracking, the severe bending to which the metal is subjected when the step is stamped into the container and to retain the cell's shape under radial sealing forces which may cause dishing. Dishing refers to the base of the container having a concave profile which may interfere with the electrical contact between the cell and the electronic device in which it is housed. Stepped metal containers generally have air diffusion chambers with heights much greater than necessary, thereby decreasing the cell volume that could be used to contain anodic material. In addition, the method of sealing against the stepped periphery of the metal container relies solely on the same forces that seal the open end of the container and does not alleviate the problem of electrolyte creepage along a metal surface past the air electrode and into the air diffusion chamber.

Other attempts have been made to overcome electrolyte leakage around the air electrode. U.S. Pat. No. 4,066,822 discloses a microporous polymer membrane which functions as an air diffusion layer between the cell container and air electrode, which membrane is compressed at its periphery between the base of the cell container and a metal sealing ring to effect a seal against leakage of electrolyte. This design is not well-suited for use in thin electrochemical cells due to the number of cell sealing components that are positioned at the sealing edge of the cell.

U.S. Pat. No. 4,105,830 discloses the use of a thin layer of sealing material disposed between the periphery of the air electrode and the gasket used for sealing the open end of the cell container, said layer of sealing material serving as an adhesive between the air electrode and gasket to contain electrolyte. This arrangement lacks any sealing means below the air electrode to prevent electrolyte leakage through the air opening in the base of the cell container.

A seal to prevent electrolyte leakage past the air electrode and out through air openings in the container base in a miniature air cell which also allocates a minimum volume of the cell for the air diffusion chamber would be a technical contribution to the field of air cells.

Hence, it is an object of the present invention to provide a miniature air cell with improved sealing means to prevent electrolyte leakage from the cell.

It is another object of the present invention to provide a seal for miniature air cells comprising a resiliently deformable member coated with a sealing agent and compressively disposed between the cell container base which has at least one air opening and the air electrode, said member having an aperture defined therein which encompasses the at least one air opening in the container base, thereby providing support for the air electrode, forming the sidewall of a thin air diffusion chamber defined between the air electrode and the container base, and serving as a barrier to prevent electrolyte leakage into said diffusion chamber.

It is a further object of the present invention to provide a method of providing a seal for miniature air cells which basically comprises the coating of a thin gasket or seal material with an adhesive sealing agent followed by treating the coated adhesive layer so that it can be handled without losing its adhesive characteristics.

DISCLOSURE OF THE INVENTION

The invention relates to a miniature air cell comprising a container having a base, an upright sidewall and an open-ended top and having at least one air opening in the base thereof; a cell assembly housed in said container having an air electrode in electrical contact with said container, an anode material situated above the air electrode, a separator layer therebetween, and an electrolyte in ionic contact with said air electrode and said anode material; a cell cover in electrical contact with said anode material; and an electrically insulating gasket interposed and compressed between said cell container and cover; the improvement being a resiliently deformable member having an aperture defined therein, said member coated on at least one surface with a sealing agent and compressively disposed between the base of said cell container and said air electrode such that the aperture defined in said member encompasses the at least one air opening in the base of said cell container thereby forming an air diffusion chamber between said air electrode and said container base, whereby electrolyte creepage past the air electrode and into said air diffusion chamber is effectively prevented, and which member provides support for the air electrode.

The invention also relates to a method of producing a handleable adhesive-coated member for use as a sealing member in miniature air cells comprising the steps of:

(a) preparing a resiliently deformable material for use as a sealing member;

(b) dissolving an adhesive sealing agent in a suitable solvent to form an adhesive coating solution; and (c) disposing said adhesive coating solution between said resiliently deformable material and a layer of a porous substance whereby the tackiness of the adhesive coating so formed is reduced by the porous layer for handleability while the adhesive sealing agent of the coating can permeate through the porous layer under a contact force.

The adhesive-coated, resiliently deformable member of the present invention is positioned in a miniature air cell between the base of the cell container having at least one air opening therein and the air electrode, the aperture in the member encompassing the at least one air opening in the container base thereby defining an air diffusion chamber. Preferably, the sealing member of this invention is a thin ring or annulus which conforms to the shape of the inside periphery of a cylindrical cell container.

As used herein an air electrode shall mean an air electrode with or without a hydrophobic layer. When a hydrophobic layer is employed, it is disposed such that it contacts the sealing ring. Generally, a hydrophobic film layer is included in an air cell assembly and is interposed between the ring of this invention and the air electrode.

When assembled in an air cell, the ring of this invention is compressed by the sealing forces which occur when the cell assembly is radially compressed and downwardly crimped to seal the open end of the cell container. The ring in turn exerts force against the base of the cell container and the air electrode, forming seals thereat to prevent and/or contain electrolyte leakage. The adhesive sealing agent, which coats at least that surface of the ring that contacts the air electrode, and which also, preferably, coats the ring surface that contacts the base of the cell container, also forms a seal to prevent and/or contain electrolyte leakage. The sealing agent is chosen to be non-wetted by the cell electrolyte and is an adhesive substance which maintains its sealing characteristics even in the absence of pressure forces. Thus the coated ring of this invention provides dual barriers to effectively prevent electrolyte leakage into the air diffusion chamber.

The thin resiliently compressible ring of the present invention must be made of a material which is inert to the alkaline electrolyte contained in the cell and to the internal cell environment. Materials such as nylon, polyproplyene, polyethlyene-tetrafluoroethlyene, acetal copolymers, polyether sulfones, and high density polyethlyene have been found to be suitable as ring materials for most applications. Other materials would be obvious to one skilled in the art. The aforementioned materials are also resiliently deformable under pressure so as to form tight seals against the air electrode and container base under the forces that occur during swaging and crimping and are sufficiently resistant to cold flow so as to maintain the structural integrity of the air diffusion chamber, and are capable of maintaining these characteristics for long periods of time.

In accordance with this invention, at least the surface of the ring which contacts the air electrode (or the hydrophobic film if employed) is coated with an adhesive sealing agent. Preferably, additional surfaces are coated with sealing agent to further improve the seal. The sealing agent is also required to exhibit mechanical and chemical stability in the presence of electrolyte. Such sealing agents are selected from the group consisting essentially of fatty polyamides, asphalt, polyisobutylene, polyurethanes, and chlorosulfonated-polyethlyene and combinations thereof.

For an optimum combination of chemical and mechanical stability, resiliency, sealing ability and ease of manufacture for most applications, it is preferred that the sealing member of this invention comprise a thin nylon ring coated with a fatty polyamide adhesive.

As an alternative embodiment of this invention, the seal member between the air electrode and the base of the cell container may comprise an absorbent material such as filter paper and the like, wherein said absorbent material has been impregnated with a sealing agent. The absorbent material which is impregnated to form a sealing ring may comprise the peripheral edge of a porous material which fills the air diffusion chamber. When the sealing ring is formed from such absorbent material, it does not exhibit a high degree of resiliency and relies primarily on the adhesive sealing agent to form an effective seal. In this embodiment, the peripheral edge of porous material would be compressed between the air electrode and container base thereby maintaining a more porous form of the material within said peripheral edge, said porous form of the material within said peripheral edge being considered the aperture defined within said peripheral edge for the purpose of this invention. Specifically, the porous material within the peripheral edge would comprise a plurality of openings through which air could permeate, thus defining an aperture in accordance with this invention.

The height of the sealing member of this invention is preferably from between about 0.001 inch (0.0025 cm) and about 0.025 inch (0.0635 cm) for cells of about 0.2 inch (0.51 cm) or less in overall height, said range providing excellent air distribution across the surface of the air electrode and occupying a small percentage of the total height of even an extremely thin electrochemical cell. The use of a resiliently deformable member of less than about 0.025 inch (0.0635 cm) in height permits a greater volume of the air cell to be filled with anodic material. The optimum height of the air diffusion chamber, whereby air is distributed uniformly across the surface of the air electrode using the least amount of cell height, is dependent on the particular dimensions of the miniature air cell, but will typically be between about 0.002 inch (0.005 cm) and about 0.005 inch (0.013 cm) for cells of the type referred to above.

The width of a sealing ring is generally from between about 0.01 inch (0.025 cm) and about 0.075 inch (0.191 cm) for miniature cells having diameters of about 0.5 inch (1.27 cm) and smaller. This range of ring widths will provide suitable sealing surfaces between the ring of this invention and the air electrode (or the hydrophobic film) and the ring and the container base. A narrow width exposes more active surface area of the air electrode to electrochemical reactions but reduces the surface area available for sealing. The width of the seal ring may vary with various cell diameters but is preferably between about 0.04 inch (0.102 cm) and about 0.06 inch (0.152 cm) for miniature cells having a diameter of about 0.5 inch (1.27 cm) and smaller.

If the cell in which the sealing member is to be contained will be radially squeezed, or swaged, so that the final diameter of the cell will be reduced, then the sealing ring should be sized so as to fit snugly against the sidewall of the assembled and swaged cell. If the cell is not to be swaged, the sealing ring of this invention should be sized to fit securely against the container sidewall when inserted.

Due to the extreme thinness of the sealing member for some cell applications, coating said member with an adhesive sealing agent can produce an unhandleable product. Tackiness problems can be overcome by laminating an adhesively coated seal member with at least one layer of a porous nonadhesive substance which decreases the tackiness of the seal member but does not prevent migration of the adhesive sealing agent to the surface of said porous layer under slight pressure. Such nonadhesive substance may comprise porous paper, talc or the like.

In one embodiment of this invention, the coated sealing member is formed by first preparing a seal member material and preparing a coating solution which comprises an adhesive sealing agent dissolved in a carrier solvent such as trichloroethylene. Solvents for the previously identified group of sealing agents are well-known to those skilled in the art. The coating solution is then applied to the seal member material which may be in the form of sheets or strips by any procedure, such as by spraying or by immersing the seal member into the coating solution, so that the concentration of sealing agent on the seal member is from between about 0.0006 $gm/cm^2$ and about 0.0018 $gm/cm^2$. The carrier solvent is next removed, for example by drying, and a suitable porous layer is applied to at least one coated side of the seal member material. This coated material will then be suitable for handling by commercial equipment for stamping out the sealing members and inserting said members into cell containers.

An alternative preparation method would comprise first stamping or otherwise forming the sealing member material into its final desired shape prior to coating the material with an adhesive sealing agent followed by applying a nonadhesive outer layer.

In addition, the adhesive sealing agent may be applied to the porous layer first, then the adhesively coated porous layer mated with the seal member material.

BRIEF DESCRIPTION OF DRAWINGS

The present invention will become more apparent from the following description thereof when considered together with the accompanying drawings which are set forth as being exemplary of embodiments of the present invention and are not intended, in any way, to be limitative thereof and wherein:

FIG. 1 is a sectional side elevation view taken through an assembled miniature alkaline air cell showing a sealing ring of the invention disposed between the air electrode and the container of the cell.

FIG. 2 is a partial cross-sectional side view of the assembly of FIG. 1 showing the sealing ring in greater detail.

DETAILED DESCRIPTION OF DRAWINGS

Referring to FIGS. 1 and 2, there is shown therein a sectional side elevation of a miniature alkaline air cell designated by reference numeral 1. The internal cell components comprise an air electrode 7, which is a laminated electrode that has a first layer 6 which is a mixture of active material such as activated carbon and binder, a second layer 8 which is a current collector, and a third layer 2 which is a hydrophobic membrane; an anode mass 3; and a separator layer 4 therebetween which permits passage of electrolyte ions across said separator but prevents migration of ions in the air electrode to the anode mass. Said internal cell components are housed in container 11 which is in intimate electrical contact with the current collector of said air electrode and sealed at its open end by electrically insulating sealing gasket 12 and cell cover 13 which is in electrical contact with the anode of the cell. The sealing gasket is radially squeezed between the cell container 11 and cover 13 so as to form a primary barrier to electrolyte leakage at said open end. The base of said container 11 has at least one air opening 10 providing ingress and egress of air within air diffusion chamber 14 to air electrode 7. Said container base is separated from said air electrode by a thin resiliently deformable ring 15 of this invention which is coated with sealing agent and forms the sidewall of air diffusion chamber 14.

The sealing surfaces of the ring 15 are shown in the enlarged, partial-view cell assembly of FIG. 2, wherein said coated ring 15 provides leakproof interfaces between the air electrode 7 and said sealing ring 15; between the sidewall of cell container 11 and said sealing ring 15; and between the base of cell container 11 and said sealing ring 15. The sealing ring of this invention is compressed during cell assembly when the cover, gasket and container are swaged and crimped, which compression provides a barrier to electrolyte leakage into the air diffusion chamber, and which forces the sealing agent that coats the ring into any voids at the above named interfaces, thereby providing primary protection from electrolyte leakage past the air electrode. The common components of FIGS. 1 and 2 have been identified with the same reference numerals. Although not shown, a porous material would preferably be placed in the air diffusion chamber 14.

The use of a sealing member in accordance with this invention will provide an effective barrier to electrolyte leakage around the air electrode of a miniature air cell and so prevent the premature end of useful cell life and minimize damage to devices in which such cells are employed.

EXAMPLE I

This example describes the method by which a coated ring of the invention was prepared from a fatty polyamide sealing agent and an acetal copolymer ring material.

A coating solution, comprising about 250 grams of a fatty polyamide sealing agent commercially available as Swift Z-610 from the Swift Chemical Company and about one liter of trichloroethylene solvent, was prepared by heating the two components to a maximum temperature of about 75° C. and stirring. The solution was not allowed to boil. After the sealing agent was dissolved, the solution was cooled to about 55° C., which temperature was maintained throughout the coating process. Acetal copolymer strips, commercially available under the tradename Celcon from the Celanese Corporation, having a thickness of about 0.005 inch (0.013 cm), were immersed in the warm coating solution then slowly and evenly withdrawn. The strips were next hung in air at room temperature for about one hour to evaporate the solvent.

Thereafter, strips of porous paper commercially available as Dexter 198T from the C. H. Dexter Company were pressed against both sides of the coated acetal copolymer strips. This laminated assembly was handleable, showing no tackiness, and was processed through automated equipment which stamped out rings having about a 0.45 inch (1.143 cm) outer diameter and about 0.04 inch (0.102 cm) width. These rings were inserted into cell containers which were further processed to fully assembled cells.

EXAMPLE II

Resistance of the seal of this invention to electrolyte leakage is demonstrated in the following example.

Miniature alkaline air cells were manufactured utilizing the coated, thin, resiliently deformable member of the present invention and monitored for electrolyte leakage. Each cell incorporated a zinc anode having an aqueous potassium hydroxide electrolyte solution and a three component air electrode which comprised a layer of activated carbon and polytetrafluoroethylene binder, a metal screen current collector and a hydrophobic layer of polytetrafluoroethylene film. The cell housing comprised about a 0.465 inch (1.182 cm) diameter flat-base container of about 0.06 inch (0.15 cm) thick nickel-plated steel, said thickness being sufficient to prevent dishing that may be caused by swaging and crimping forces, and having about a 0.014 inch (0.035 cm) diameter air opening at the center of said container base.

A nylon sealing member, shaped as a ring having an about 0.46 inch (1.180 cm) outer diameter, an about 0.34 inch (0.864 cm) inner diameter and a height of about 0.005 inch (0.013 cm) was coated with a polyamide sealing agent available under the tradename Swift Z-610 from the Swift Chemical Company in the manner described in Example I. The adhesive coated sealing ring was inserted into the cell container with about a 0.004 inch (0.010 cm) thick porous paper layer placed within the aperture of the sealing ring. The porous layer was included to maintain the structural integrity of the air diffusion chamber. A porous polytetrafluoroethylene film was placed over the sealing ring and porous layer and then a three component electrode assembly was placed in the cell container. A separator comprising a cellulosic barrier film and an electrolyte absorbent layer was placed over the air electrode and a nylon sealing gasket inserted.

A cell cover was filled with anodic material and mated with the aforedescribed portion of the cell assembly. The mated cell was then swaged and crimped, during which operation the outer diameter of the cell was reduced from about 0.465 inch (1.182 cm) to about 0.452 inch (1.148 cm).

The air opening in the base of the cell container was sealed during swaging and crimping operations and during a subsequent washing whereby any surface contaminants were removed with a tape available commercially as Polyester Film Tape #8402 from the 3M Company which prevents flooding the porous layer during washing.

One hundred fifty of the above described cells were stored and observed for salt formation on the surface of the cell; one hundred cells having the tape over the air opening, as is done in commercial storage of such cells until use, and fifty cells having the tape removed from the air opening during storage. After four months of storage no salt formation or electrolyte leakage was observed in any of the 150 miniature alkaline air cells.

An additional number of miniature alkaline air cells manufactured in the manner described herein above were fully discharged before being placed in storage. Leakage at the air opening vent was monitored and is shown below in Table I.

TABLE I

| Leakage at Air Opening Vent After Discharge | | | | |
|---|---|---|---|---|
| Age of Cells After Discharge (Months) | 3 | 11 | 13 | 15 |
| Number of Cells | 20 | 5 | 14 | 9 |
| Number of Cells With Observed Leakage | 0 | 0 | 2 | 1 |

Of the forty eight air cells in this study, three showed some degree of leakage. Inspection of the three cells that allowed electrolyte leakage past the air electrode showed that the porous paper layer of each cell had been placed in the cell off-center resulting in a wicking path for electrolyte leakage, which leakage would occur in spite of the use of the seal ring of this invention.

Whereas the specifications has dealt with alkaline air cells, it should be understood that the present invention may be applied to any air cell utilizing any type of electrolyte.

Although the present invention has been described and set forth in some detail, it should be further understood that the same is susceptible to changes, modifications, and variations without departing from the scope and spirit of the invention as set forth in the appended claims.

I claim:

1. A miniature air cell comprising a container having a base, an upright sidewall and an open-ended top and having at least one air opening in the base thereof; a cell assembly housed in said container having an air electrode in electrical contact with said container, an anode material situated above the air electrode, a separator layer therebetween, and an electrolyte in ionic contact with said air electrode and said anode material; a cell cover in electrical contact with said anode material; and an electrically insulating gasket interposed and compressed between said cell container and cover; the improvement being a resiliently deformable member having an aperture defined therein, said member coated on at least one surface with a sealing agent and compressively disposed between the base of said cell container and said air electrode such that the aperture defined in said member encompasses the at least one air opening in the base of said cell container thereby forming an air diffusion chamber between said air electrode and said container base and whereby electrolyte creepage past the air electrode and container base into said air diffusion chamber is effectively prevented, and which member provides support for the air electrode.

2. The miniature air cell in accordance with claim 1 wherein said resiliently deformable member is made of a material selected from the group consisting of nylon, polypropylene, polyethylenetetrafluoroethylene, acetal copolymers, polyether sulfones and high density polyethylene.

3. The miniature air cell in accordance with claim 1 wherein said resiliently deformable member comprises an absorbent material impregnated with a sealing agent.

4. The miniature air cell in accordance with claim 1 or 3 wherein said sealing agent is selected from at least one member of the group consisting of fatty polyamides, asphalt, polyisobutylene, polyurethanes and chlorosulfonated polyethylene.

5. The miniature air cell in accordance with claim 1 wherein said resiliently deformable member is an annulus compressively disposed between the base of said cell container and said air electrode wherein said annulus contacts the lower sidewall and the base of said cell container and the air electrode.

6. The miniature air cell in accordance with claim 5 wherein the uncompressed height of said annulus is from between about 0.0025 and about 0.0635 centimeter.

7. The miniature air cell in accordance with claim 5 wherein the uncompressed width of said resiliently deformable material is from between about 0.025 and about 0.191 centimeter.

8. The miniature air cell in accordance with claim 5 wherein said annulus is nylon which is coated with a fatty polyamide sealing agent.

* * * * *